United States Patent Office 2,846,364
Patented Aug. 5, 1958

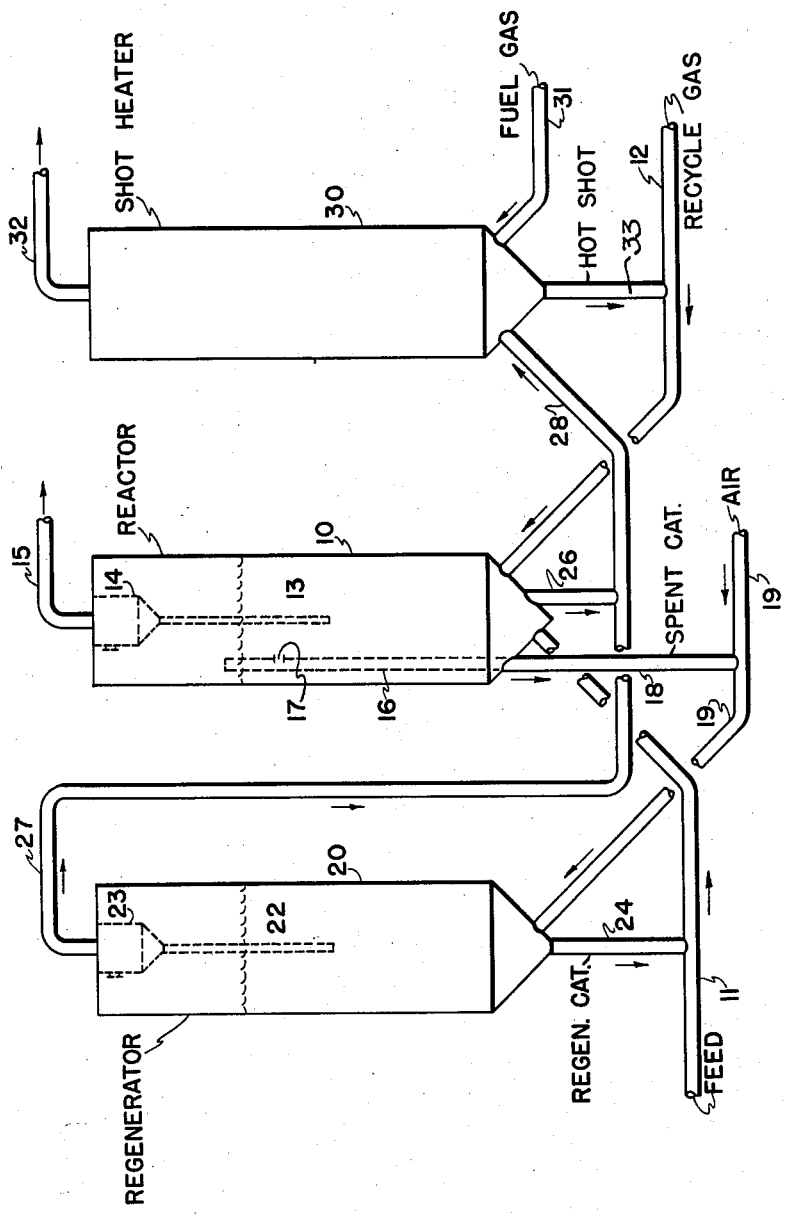

2,846,364
FLUID HYDROFORMING PROCESS USING A PLATINUM CATALYST AND INERT HEAT TRANSFER SOLIDS

Albert B. Welty, Jr., Westfield, N. J., assignor to Esso Research and Engineering Company, a corporation of Delaware Application December 1, 1954, Serial No. 472,341

3 Claims. (Cl. 196—50)

This invention pertains to the catalytic conversion of hydrocarbons and more particularly to the catalytic reforming or hydroforming of hydrocarbon fractions boiling in the motor fuel or naphtha range of low octane number into high octane number motor fuels rich in aromatics.

Hydroforming is a well-known process for treating hydrocarbon fractions boiling in the motor fuel or naphtha range to upgrade or increase the aromaticity and improve the anti-knock and engine cleanliness characteristics of such fractions. By hydroforming is ordinarily meant a conversion process conducted at elevated temperatures and pressures in the presence of solid catalyst particles and hydrogen whereby the hydrocarbon fraction is increased in aromaticity and in which conversion there is no net consumption of hydrogen. Hydroforming is ordinarily carried out in the presence of hydrogen or hydrogen-rich recycle gas (i. e., at relatively high hydrogen partial pressures) in the pressure range of from about 50 to 1000 pounds per square inch, at temperatures of from about 850°–1050° F., and in contact with catalysts such as platinum or palladium, molybdenum oxide, chromium oxide, or other group VI metal oxides or sulfides, preferably dispersed or supported upon a base or spacing agent such as alumina gel, precipitated alumina, or zinc aluminate spinel.

It has been proposed to effect the hydroforming of naphtha fractions in a fluidized solids reactor system in which the naphtha vapors are passed continuously through a dense, fluidized bed of hydroforming catalyst particles in a reaction zone, spent catalyst particles are withdrawn from the dense bed in the reaction zone and passed to a separate regeneration zone where inactivating carbonaceous deposits are removed by combustion, whereupon the regenerated particles are returned to the main reactor vessel.

In view of the fact that selectivity considerations require the use of relatively low catalyst to oil ratios, it has been proposed to circulate inert heat transfer solids or shot in such systems to absorb excess heat released in the regenerator and to transfer this excess heat to the main reaction zone and thus supply a substantial part of the heat required for the hydroforming reaction.

The present invention pertains to an improved method of effecting hydroforming in a fluidized solids system employing shot for supplying a substantial part of the heat of reaction and particularly to such systems in which platinum group metal catalysts are employed.

In accordance with this invention, in a fluid solids system consisting of a reactor, regenerator, and a shot heater, air is first used in the regenerator and the off gases from the regenerator are then passed to the shot heater where an auxiliary fuel is burned by the oxygen contained in the regenerator off gases. Ordinarily a conventional fluid solids regenerator is run in such a way as to have a very low percentage, like 1% or less, of oxygen in the outlet gas. This is usually necessary, since air compression, particularly to hydroformer system pressures is very costly and economy demands that the use of excessive amounts of air be avoided.

In the process of this invention, a substantially higher concentration of oxygen is maintained in the regenerator, which is very beneficial to the catalyst, since apparently oxygen adsorbed on the surface discourages growth of platinum crystals. This helps to maintain the catalyst in a highly active state. For example, instead of running the regenerator at a temperature and a v./v./hr. such as to consume practically all the oxygen, these factors are adjusted to leave about 5 to 15% oxygen by volume in the outlet gas. This partially spent air is used to pick up shot withdrawn from the reactor and to carry it to the shot heater where an auxiliary fuel is introduced to consume the remainder of the oxygen and heat the shot to the desired temperature. The heated shot is then withdrawn from the heater, picked up by a suitable gas stream such as recycle gas, and returned to the reactor.

The features of the present invention will be understood from the detailed description of the accompanying drawing illustrating the same by a schematic flow diagram.

Referring to the drawing, the fluid solids system comprises three main vessels, reactor 10, regenerator 20, and shot heater 30. Naphtha feed vapors preheated to the desired temperature are supplied through line 11 and hydrogen-rich process or recycle gas, also suitably preheated, is supplied through inlet line 12 to the lower part of reactor vessel 10. The reactor is charged with finely divided hydroforming catalyst, preferably one containing about 0.5 weight percent platinum upon an activated alumina support. The reactor is also charged with inert heat transfer solids or shot generally of larger average particle size and higher density than the catalyst particles. The superficial velocity of the naphtha feed vapors and the hydrogen-rich gas passing through the reactor is controlled to maintain a dense fluidized bed 13. Reaction products pass overhead from the reactor through a cyclone separator 14 or the like for separating the major part of hte catalyst entrained with the reaction products. The separated catalyst is returned to the reactor dense bed through dip legs attached to the cyclone separators. Reaction products substantially free of catalyst particles are then passed via products outlet line 15 to suitable products recovery and storage equipment not shown. In the products recovery equipment, the vaporous reaction products are generally heat exchanged with fresh feed in order to partially preheat the same, whereupon the partially cooled reaction products are condensed to separate normally liquid reaction products from normally gaseous materials consisting essentially of hydrogen intermixed with minor amounts of low molecular weight hydrocarbons such as methane, ethane, and propane. This hydrogen-rich process gas is thereupon passed through suitable compressors, scrubbers, if desired, and heating coils preparatory to recycling the same to the reactor as through inlet line 12.

Spent catalyst, substantially free of inert heat transfer solids or shot, is withdrawn from the reactor by providing a withdrawal well or conduit 16 in the reactor vessel, desirably with its upper end extending above the level of the dense bed 13, and with an inlet port or orifice 17 near the top of the dense bed. The spent catalyst, preferably after stripping with steam or other gaseous stripping agent, is discharged into standpipe 18 and thence into conduit 19 where it is picked up by a stream of air and conveyed into catalyst regenerator 20 where inactivating carbonaceous deposits are burned off.

The superficial velocity of the air passing through regenerator 20 is so controlled as to form a dense fluidized bed 22 of catalyst and air or regeneration gases. In accordance with this invention the amount of air or oxygen supplied to the regenerator is so proportioned with respect to the combustibles carried by the spent catalyst to the regenerator that the gases leaving the regenerator contain at least 5 volume percent and may contain 15 volume percent of oxygen. The regeneration gases are taken overhead from the regenerator through a cyclone separator 23 or the like which serves to separate entrained catalyst particles from the outlet gas.

Regenerated catalyst particles are withdrawn directly from the dense bed 22 through a withdrawal conduit similar to that shown in the reactor or directly into a standpipe 24 attached to the bottom of the reactor. Gas inlets, not shown, are provided on the standpipe for further treatment, stripping, and/or fluidizing the regenerated catalyst. For example, air or oxygen-rich gas may be introduced near the top of the standpipe to effect a final cleanup of the catalyst and nitrogen or scrubbed flue gas may be introduced lower down in the standpipe in order to strip off oxygen and/or carbon oxides and thereby prevent their transfer to the reaction zone where they may have an adverse effect upon the hydroforming reaction. If desired, small amounts of a gaseous halogen, preferably anhydrous chlorine, may also be introduced separately or with the above-mentioned gaseous agents in order to activate the regenerated catalyst. The regenerated catalyst is discharged from the standpipe 24 into transfer line 11 where it is picked up by a stream of feed vapors and/or recycle gas and conveyed thereby back into the reaction zone.

The shot particles, which may be Mullite, Corundum, or metal particles such as Monel, stainless steel or the like, are larger (about 300-500 microns) and of greater density than the catalyst, and accordingly tend to settle through the reactor and are most conveniently withdrawn from the bottom of the vessel as through outlet line 26. Oxygen-rich regeneration gases substantially free of catalyst particles are taken overhead from regenerator 20 through line 27 and then used to pick up shot discharged from outlet line or standpipe 26 and convey the shot through transfer line 28 into shot heater 30. Sufficient fuel such as process tail gas, natural gas, or the like, is supplied to shot heater 30 as through inlet line 31 to consume at least a major proportion of the oxygen remaining in the regeneration gas, thereby heating the shot in vessel 30 to temperatures of about 1100°-1200° F. The combustion products are passed overhead from heater vessel 30 through outlet line 32 whence they may be passed through a waste heat boiler and then discharged to a waste or flue gas stack. The heated shot particles are withdrawn from the bottom of shot heater vessel 30 and are discharged via standpipe or conduit 33 into a transfer line, for example, recycle gas inlet line 12, for recycling to the reactor vessel 10.

It will be understood that the description is intended to be illustrative rather than definitive of the present invention and that numerous devices such as valves, pressure gauges, aeration taps, etc., will be necessary for the proper functioning of such a system. Moreover, while the several vessels are shown to be at substantially the same level, it will be obvious that the several vessels may be arranged at different levels or elevations in order to take advantage of gravity to effect transfer of solids from one vessel to another. It would be desirable, for example, to have the shot heater vessel and/or the regenerator elevated sufficient that the shot and/or the catalyst can flow back to the reactor without the use of a lift gas. It would be especially desirable to have the shot return to the reactor vessel near the upper part of dense bed 13 in order that the shot may traverse enough of the bed to give up its heat to the reactants and catalyst.

The catalyst charged to the reactor system may be any reforming or hydroforming catalyst such as molybdenum, chromium, tungsten, vanadium oxide, cobalt molybdate, nickel-tungsten sulfide, but is preferably platinum or other platinum group metal. The catalytic component is dispersed upon a base or support such as adsorptive or activated alumina, alumina gel, zinc aluminate spinel, or the like. Suitable catalysts contain from about 5 to 15 weight percent molybdenum oxide or 10 to 40 weight percent chromic oxide on activated alumina. The preferred catalysts contain 0.05 to 2.0 weight percent platinum upon activated alumina, preferably upon eta alumina. The catalyst particles, for proper fluidization, should be between about 200 and 400 mesh or about 10 to 200 microns in diameter, with a major proportion between about 20 and 100 microns.

The feed or charging stock to the hydroforming reaction may be a virgin naphtha, a thermally or catalytically cracked naphtha, a Fischer-Tropsch naphtha, or a mixture of two or more of these materials having a boiling range of from about 100° F. to about 450° F., or it may be a narrow boiling cut from within this range. The feed stock is preheated alone or in admixture with the recycle gas to reaction temperature or to the maximum temperature possible while avoiding thermal degradation of the feed stock. Ordinarily preheating of the feed stock is carried out at temperatures of about 800°-1000° F., preferably about 950° F.

Recycle gas which contains 50 volume percent or more of hydrogen is circulated through the reaction zone at a rate of from about 500 to 8000 cubic feet per barrel of naphtha feed. The hydrogen-rich recycle gas is preheated to temperatures of about 1000°-1200° F. In view of the fact that inert heat transfer solids or shot are utilized to supply heat to the reaction zone, it is not necessary to supply as much recycle gas or heat it to such high temperatures as is necessary in the absence of such heat transfer solids.

The hydroforming reactor vessel is preferably operated at temperatures between 800° F. and 1050° F., preferably at about 900°-950° F., and at pressures of from about 50 to 1000, preferably about 100 to 200 pounds per square inch.

The regenerator and the shot or inert solids heater are operated at essentially the same pressure as the hydroforming reactor vessel. The temperature in the regeneration zone is about 950°-1150° F., preferably about 1000°-1050° F. The average residence time of the catalyst in the reactor is of the order of about two hours to fifty hours, while the average residence time of the catalyst in the regenerator is of the order of from about one hour to ten hours. The average residence time of the heat transfer solids or shot in the reaction zone is of the order of from about ten minutes to thirty minutes and in the heater of from about thirty minutes to two hours.

The weight ratio of catalyst to oil introduced into the reaction zone may vary from about 0.01/1 to 1.0/1 and is preferably about 0.05/1. Space velocities or weight in pounds of feed charged per pound of catalyst in the reactor depends upon the age or activity level of the catalyst, the character of the feed stocks, and the desired octane number of the product. It may vary between about ½ and 10 w./hr./w.

The foregoing description contains a limited number of embodiments of the present invention. It will be understood, however, that this invention is not limited thereto, since numerous variations are possible without departing from the scope of this invention.

*Example*

A naphtha having the following inspections is hydroformed according to the present invention:

Feed—West Texas virgin naphtha:

| | |
|---|---|
| IBP | ° F__ 200 |
| 10% | ° F__ 230 |
| 50% | ° F__ 290 |
| 90% | ° F__ 375 |
| FBP | ° F__ 390 |
| S | percent wt__ 0.11 |
| ASTM F-1 oct. no | 59.0 |
| Aromatics | percent vol__ 10 |
| Paraffins | percent__ 48 |
| Naphthenes | do____ 42 |

The reaction and regeneration conditions are as follows:

| | |
|---|---|
| Pressure _____lbs__ | 130 |
| Reactor temp_____°F__ | 960 |
| Regenerator temperature_____°F__ | 1040 |
| Shot heater temperature_____°F__ | 1200 |
| W./hr./w_____ | 3.0 |
| Catalyst/oil weight ratio_____ | 0.03/1 |
| Residence time of catalyst in reactor____hours__ | 10 |
| Residence time of catalyst in regenerator__do____ | 5 |
| Shot/oil weight ratio_____ | 3/1 |

Analysis of gas leaving regenerator ($H_2O$-free basis), vol. percent:

18.0% $O_2$
1.2% $CO_2$
0.8% CO
80.0% $N_2$

Analysis of gas leaving shot heater ($H_2O$-free basis), vol. percent:

2.0% $O_2$
10.7% $CO_2$
5.4% CO
82.7% $N_2$

Shot is mullite of 400–550 micron diameter. Mullite is a refractory alumina. Catalyst is 0.6% platinum upon alcoholate alumina bases made by impregnating with chloroplatinic acid.

What is claimed is:

1. In a method of reforming hydrocarbon fractions boiling within the motor gasoline range in contact with a fluidized bed comprising mixture of a major proportion of finely divided hydroforming catalyst and a minor proportion of inert heat transfer solid particles or shot in a reaction zone the improvement which comprises withdrawing a stream of catalyst particles from the dense bed in the reactor zone, contacting the withdrawn catalyst particles with an excess of air in a regeneration zone, withdrawing a stream of shot particles from the reaction zone, withdrawing a stream of hot regeneration gases containing residual free oxygen and substantially free of catalyst from the regeneration zone, conveying the withdrawn shot particles in said stream of hot regeneration gases to a heating zone, burning an extraneous fuel with the residual free oxygen in the regeneration gases in said heating zone and recycling catalyst from the regeneration zone and heated shot from the heating zone to the main reaction zone.

2. In a method of reforming hydrocarbon fractions boiling within the motor gasoline range in contact with a fluidized bed comprising mixture of a major proportion of finely divided platinum group metal hydroforming catalyst and a minor proportion of inert heat transfer solid particles or shot in a reaction zone the improvement which comprises withdrawing a stream of catalyst particles from the dense bed in the reaction zone, contacting the withdrawn catalyst particles with air in a regeneration zone in sufficient amount that the regeneration gases leaving the regeneration zone contain from 5 to 15 volume percent oxygen, withdrawing a stream of shot particles from the reaction zone, withdrawing a stream of hot regeneration gases substantitally free of catalyst from the regeneration zone, conveying the withdrawn shot particles in said stream of hot regeneration gases to a heating zone, burning an extraneous fuel with the residual oxygen in the regeneration gases in said heating zone and recycling catalyst from the regeneration zone and heated shot from the heating zone to the main reaction zone.

3. The process as defined in claim 2 in which the catalyst consists essentially of 0.5 to 2.0 weight percent of platinum dispersed upon alumina.

References Cited in the file of this patent

UNITED STATES PATENTS

| | | |
|---|---|---|
| 2,368,507 | Welty _____ | Jan. 30, 1945 |
| 2,446,247 | Scheineman _____ | Aug. 3, 1948 |
| 2,459,836 | Murphree _____ | Jan. 25, 1949 |
| 2,606,878 | Haensel _____ | Aug. 12, 1952 |
| 2,636,865 | Kimberlin _____ | Apr. 28, 1953 |
| 2,710,827 | Goronowski _____ | June 14, 1955 |
| 2,721,167 | Nicholson _____ | Oct. 18, 1955 |